Patented Nov. 23, 1948

2,454,452

UNITED STATES PATENT OFFICE 2,454,452

LUBE ADDITIVES MADE BY SOLVENT REFINING HIGH MOLECULAR WEIGHT ALIPHATIC-AROMATIC CONDENSATION PRODUCTS

Caleb E. Hodges, Roselle, N. J., and Aloysius F. Cashman, Staten Island, N. Y., assignors to Standard Oil Development Company, a corporation of Delaware No Drawing. Application September 19, 1946, Serial No. 697,920

15 Claims. (Cl. 252—58)

This invention relates to an improved chemical condensation product and methods of preparing and using same, and more particularly it relates to an improved method of refining or finishing a Friedel-Crafts condensation product which is particularly useful as an addition agent in waxy mineral lubricating oils since it has both the property of reducing and pour point of such oils and also of improving the viscosity index thereof.

It is already known according to U. S. Patent 1,815,022 and others such as 2,174,246 that chlorinated paraffin wax can be condensed with naphthalene to make high molecular weight condensation products which have pour depressing properties, however, such products as generally heretofore made, do not have any viscosity index-improving property.

The type of condensation product to which the invention is found particularly applicable is that made according to U. S. Patent 2,339,493, and obtained by condensing a halogenated high molecular weight aliphatic material having more than 10 carbon atoms with an aromatic compound by mixing together the aromatic compound, a Friedel-Crafts catalyst and a low molecular weight halogenated hydrocarbon solvent inert under the reaction conditions used, adding the halogenated high molecular weight aliphatic hydrocarbon of at least 15% halogen content, and maintaining the mixture at a reaction temperature until the reaction is completed, the arithmetical product of the percent of catalyst (based on the weight of halogenated high molecular weight aliphatic material), times the square of the percent by weight of halogen in the halogenated high molecular weight aliphatic material being at least 400. This process is typified by mixing together naphthalene, aluminum chloride and tetrachlorethane and adding thereto chlorinated paraffin wax containing about 25% chlorine, using about 3-8 mols of chlorinated wax per mol of naphthalene, about 1-3% of aluminum chloride based on the chlorinated wax and about 20-100 volumes of tetrachlorethane per 100 volumes of chlorinated wax, and maintaining the reaction mixture at a temperature between the approximate limits of 70-150° F. for a reaction time of about 1 to 5 hours, subsequently treating the reaction mixture with a hydrolyzing agent, settling and removing the sludge and distilling the reaction products under reduced pressure, e. g., by vacuum or fire and steam distillation, to a temperature of at least 400° F. or somewhat higher to obtain as distillation residue the desired wax-naphthalene condensation product having both pour-depressing and V. I.-improving properties. If, as is generally the case, the product is intended to be used as a lubricating oil additive, it is desirable to add a small amount of a refined lubricating oil basestock before removing the volatile solvent in the above mentioned final distillation step.

For the sake of simplicity, this type of condensation product will be referred to as Product A.

One difficulty which has been experienced in the refining or recovery of Product A is that it is difficult to remove all of the chlorine-containing compounds, which may consist of residual chlorinated hydrocarbon solvent or of condensation products of naphthalene with chlorinated wax in which only part of the chlorine had reacted and been removed. The residual chlorine content has in several instances ranged from about 8 to 15% by weight based on the condensation product per se, or about 3 to 6% by weight based on the oil blend obtained when the condensation product is recovered in the presence of some lubricating oil added prior to the removal of volatile solvent by distillation. While for use in certain fields the presence of a small amount of tetrachlorethane or other relatively inert chlorinated hydrocarbon liquid or condensation product containing some residual chlorine will not be objectionable, in other cases it is desirable to remove such traces as completely as possible from the product.

Accordingly it is one object of this invention to remove residual traces of halogenated hydrocarbon solvent from Product A type of condensation products. Another object of the invention is to prepare such condensation products which are substantially free of halogen, i. e., which have less than about 6%, preferably less than about 4%, based on the refined condensation product per se, or less than 2% and preferably less than 1% of halogen on the basis of the oil blend, and which are accordingly safer to use in applications where the presence of halogenated hydrocarbons might tend to cause corrosion of metals or other undesirable results.

These and other objects and advantages will appear more fully from the following description and examples.

Broadly, the invention comprises solvent-extraction Product A with a suitable solvent for halogenated hydrocarbon liquids.

The liquid to be used as solvent for this solvent extraction according to the present invention is preferably an organic liquid containing hydrogen and carbon and at least one other element and is preferably an organic liquid having preferential solvency for halogenated hydrocarbon liquid in preference to aliphatic or aryl-aliphatic hydrocarbons, such as materials selected from the following general classes, in which one or more specific examples are given for the sake of illustration.

| Class | Specific Examples |
|---|---|
| Esters | Ethyl Acetate, Amyl Acetate, Isopropyl Butyrate, etc. |
| Alcohols | Methyl, Ethyl, Isopropyl, etc. |
| Ketones | Acetone, Methyl Ethyl Ketone, Ethyl Isopropyl Ketone, etc. |
| Phenols | Phenol, Cresols, Catechol, etc. |
| Amines | Aniline, n-Amyl amine, Pyridine, etc. |
| Ethers | Ethyl Ether, Isopropyl Ether, Catechol-Mono Ethyl Ether. |
| Nitroaliphatics | Nitro ethane, Nitro heptane, Nitro hexane. |
| Nitroaromatics | Nitro benzene, Nitro toluene, etc. |
| Amino-Alcohols | Triethanol Amine, 2-Amino-1-Butanol, 2-Amino-1-methyl propanol. |
| Heterocyclic Derivatives | Furan, Dioxane, Pyridine, Furfuraldehyde. |

Also, if desired, mixtures of two or more of these various solvents may be used, and the solvent extraction may, if desired, be carried out in the presence of a suitable diluent such as a naphtha or a suitable, preferably, volatile diluent, for one or both phases of the solvent extraction, such as a volatile naphtha or non-volatile lube oil serving as diluent for the Product A phase, and methyl alcohol as a diluent for the solvent phase.

It is particularly desirable to use as solvents compounds which contain at least one aliphatic hydrocarbon group and at least one of the elements oxygen and nitrogen, particularly compounds in which the number of oxygen atoms is at least one-half as great as the number of carbon atoms in the molecule, esters having given particularly favorable results, especially the lower esters, such as ethyl acetate.

The solvent extraction may be carried out under a fairly wide range of temperature, such as between about room temperature and about 300° F., but preferably the temperature should be about 150-250° F., and the pressure may be atmospheric or slightly above or below atmospheric, the use of superatmospheric pressure being especially desirable if a solvent and/or diluent is used which has substantial volatility under the temperature desired to be used. A reflux condenser may be used for volatile solvents. The solvent extraction may be carried out by batch operation, using one or more stages, or may be carried out by continuous contacting of the Product A and solvent. The extraction may be carried out either concurrently or countercurrently, and it is preferable to use a continuous countercurrent solvent extraction in suitable apparatus such as a vertical tower, which may optionally contain baffle plates or packing material in order to increase the mixing or contacting of the Product A and solvent, as by feeding the Product A into the tower near the top thereof and feeding the solvent, such as ethyl acetate into the tower near the bottom thereof, the refined, i. e. substantially halogen-free Product A being withdrawn continuously from the bottom of the tower, and withdrawing continuously from the top of the tower the ethyl acetate or other solvent containing dissolved therein the halogenated hydrocarbon liquid extracted from the raw or fresh Product A. The height of such a countercurrent extraction tower should preferably be at least three times the diameter, and preferably 5 to 10 or 15 or more times the diameter, and the solvent extract phase should preferably be continuously separated into its several constituents, i. e. the solvent, halogenated hydrocarbon (extracted from the Product A) and hydrocarbon blend oil which may have been added to the Product A prior to the extraction step, and the ethyl acetate or other extraction solvent may be continuously recycled for further extraction.

In the normal course of preparation of the Product A, using tetrachlorethane as the solvent, it is possible that the amount of residual chlorine in the Product A per se, free of blend oil may be as high as 10 to 15%, at least part of this chlorine being probably chemically combined in the product, and by the use of a solvent extraction according to this invention, this chlorine content may be reduced to less than 6% and preferably even less than 1⁄4%.

Although the preparation of the Product A per se does not constitute part of the present invention, the following description of such preparation is given for the sake of illustration. The condensation of chlorinated wax and naphthalene is carried out by using a chlorinated wax having a chlorine content of at least 15%, and preferably 20% to 30%, and an amount of aluminum chloride between the approximate limits of 0.5% and 5.0%, with the important additional requirement that the arithmetical product of the percent of catalyst, based on the weight of chlorinated wax, times the square of the percent by weight of the chlorine in the chlorinated wax should be at least 400. Although the exact mechanism of chemical reactions involved in this process is not well understood, it is believed that the success of the process depends to a substantial extent upon the use of a sufficient amount of aluminum chloride catalyst to cause proper reaction of the trichlor-wax molecules in the chlorinated wax used as raw material. Examination of chlorinated waxes containing various amounts of chlorine indicates that although there is a minor proportion of trichlor product present with a major proportion of mono- and dichlor waxes in mixed products containing less than about 15% Cl, yet when the chlorine content is 15% or above the relative proportion of monochlor and dichlor waxes decreases sharply with a correspondingly great increase in the proportion of trichlor wax so that in chlorinated waxes containing 15% or over of chlorine the trichlor and higher substituents are present in prepondering amount and at approximately 20% Cl content there is about 75% of trichlor or higher substituents present. When the chlorine content reaches as high as 25%, there is relatively little mono- or di-substituent present.

In carrying out this condensation a large number of materials has been tested and found successful. In the class of aromatic compounds, naphthalene has given outstandingly superior results and accordingly it is the preferred aromatic material to be used. However, other aromatic compounds have given fairly good results, especially with control of reaction conditions such as by the use of a relatively low proportion of solvent and a high proportion of catalyst, without, however, using very elevated temperatures unless necessary. Thus other aromatic compounds which may be used include benzene, phenol, betanaphthol, diphenylene oxide, polymers of dihydronaphthalene such as a tetramer thereof, and diphenyl, as well as other compounds analogous or equivalent thereto, as well as mixtures of two or more aromatic compounds, such, for instance, as found in coal tar fractions containing naphthalene, anthracene, and other polynuclear aromatic hydrocarbons and derivatives thereof.

Instead of using chlorinated paraffin wax, one may also use other halogenated high molecular weight aliphatic materials, such as chlorinated petrolatum, chlorinated beeswax, and chlorinated derivatives of substantially saturated aliphatic hydrocarbon polymers, such as chlorinated polyethylene.

Although aluminum chloride is believed the best catalyst both from the point of view of cost and efficiency, other Friedel-Crafts catalysts may be used if desirable, such as ferric chloride, titanium tetrachloride, boron chloride, or boron fluoride, or their mixtures.

The low molecular weight halogenated hydrocarbon solvent should be one which is inert under the condensation reaction conditions used. Preferably it should be a chlorinated hydrocarbon having not more than 4 carbon atoms and preferably containing 3 or more chlorine atoms. Tetrachlorethane has been found to be especially suitable, although dichlorbenzene, trichlorethane, ethylene dichloride, trichlorbenzene, etc., may be used, if desired. Although this solvent does not actually enter into the chemical condensation reaction, nevertheless it has a definite influence on the course of the reactions because if a hydrocarbon solvent such as refined kerosene is used instead of chlorinated hydrocarbon solvent, in a condensation involving a chlorinated wax containing 20% or more chlorine, the resulting condensation product will consist almost entirely of a rubbery product which is completely insoluble in mineral oil.

Another important requirement for carrying out this condensation is the proper order of adding the ingredients, namely, the chlorinated wax must be added last in order to avoid formation of oil-insoluble condensation products when starting with chlorinated wax containing 20% or more of chlorine.

The proportions of aromatic compound and chlorinated wax may be varied over a fairly wide range without seriously interfering with the production of the desired viscosity-index improving property. For instance, usually from 1–10 mols of chlorinated wax may be used for one mol of aromatic compound, preferably about 3–8 mols of chlorinated wax may be used for one mol of aromatic compound. Since chlorinated wax is probably the most important raw material and is generally used in large amounts, one of the easiest ways to calculate the amount of various raw materials to be used is to base all calculations on 100 parts by weight or by volume of chlorinated wax and in such a case the amount of aromatic compound to be used should range from about 5 to 30 parts by weight, or preferably about 10 to 15 parts in the case of naphtha-lene. On this same basis, when using 100 parts of chlorinated wax by weight, the aluminum chloride or other catalyst to be used should be about 0.5 to 5.0%, or preferably about 1 to 3%. The amount of chlorinated hydrocarbon solvent to be used should be about 10 to 200 volumes, or preferably 20 to 100 volumes, for each 100 volumes of chlorinated wax.

The reaction temperature should be maintained below 200° F., except in a few particular instances where the aromatic compound is not very reactive, and preferably should range from room temperature to 150° F. The reaction time may vary over a fairly wide range depending upon the amount of catalyst and solvent as well as the reaction temperature but normally it should be within the approximate limits of 5 minutes and 10 hours, and preferably from ¼ hour to 5 hours.

After the condensation reaction has been completed, which may usually be determined approximately by the degree of increase in the viscosity of the reaction mixture and/or the cessation of the liberation of any hydrogen chloride, the reaction mixture is then, for convenience, diluted with additional solvent, such as refined kerosene, or a chlorinated hydrocarbon solvent, such as tetrachlorethane or ethylene dichloride, and neutralized or hydrolyzed by adding water or an aqueous solution of caustic soda, or alcohol or any suitable hydrolyzing agent or mixture of two or more of them. After the settling and removal of the sludge layer, the reaction product is then subjected to distillation, starting at either normal or reduced pressure, but in any case completing the distillation under substantially reduced pressure, such as by using fire and steam distillation or by vacuum distillation, in order to obtain the desired high molecular weight distillation residue, without causing any substantial cracking. If vacuum distillation is used, it may be controlled to an absolute pressure of between about 5 and 100 millimeters of mercury, preferably about 10 to 50 millimeters. Usually, whether fire and steam distillation is used or vacuum distillation, the final temperature to which the distillation is carried should be at least 350° F., and preferably at least 400° F., and it may be 500° F. or 600° F.

A few tests indicate that a vacuum distillation under an absolute pressure of about 20 to 50 millimeters of mercury carried up to a temperature of 330° F. gave distillation results substantially equivalent to fire and steam distillation carried up to about 380° or 400° F. If desired, the condensation product may be recovered as a blend in heavy lubricating oil, by adding a small amount of a suitably high-boiling fraction to the reaction product just prior to or during the distillation. This is preferable when it is desired to avoid redissolving the condensation product for use in lubricating oils.

The condensation product per se is a viscous liquid of approximately ½ Robinson color with a green cast or bloom and soluble in hydrocarbon oils. As it undoubtedly is not all one single compound but is probably a mixture of a number of different compounds having slightly different structure, the mixed product may, if desired, be separated before or after the chlorine-eliminating solvent extraction of this invention, into different fractions by various suitable means, such as distillation, solvent extraction under other conditions, etc., in order to recover one or more fractions which are especially potent in regard to viscosity-index improvement and/or pour depressing as well as oxidation-inhibiting and sludge-dispersing characteristics.

The amount of addition agent to be used in lubricating oils may vary over a fairly wide range, such as from about 0.5% to 10% when it is desired to effect a substantial improvement in the viscosity index of the lubricating oil base stock, which may be paraffinic, naphthenic, mixed base, etc., but it may be used in considerably smaller amounts, such as 0.5%, 0.1%, 0.05% or even 0.01%, when it is desired to use this addition agent merely for pour-depressing in a paraffinic oil or for its oxidation-inhibiting properties. An important advantage of this condensation product, especially in contrast to other products previously made from the same raw materials but under different reaction conditions is that it not only has good pour-depressing properties when used in small amounts, such as 0.1% or 0.5%, but also when used in very much larger amounts, such as 2% or 5% as may be desirable when using it to improve both viscosity index and pour point. Many previously known pour depressors are effective only in amounts less than 1% or 2% and are either ineffective or in some cases raise the pour point of the lubricating oil base stock when used in concentrations as large as 3%, 5%, 7%, or 10%.

For the sake of illustrating the present invention, i. e., the improved method of recovering Product A substantially free of residual halogen by solvent extraction, the following examples are given.

Example 1

A sample of Product A was made from the following raw materials:

| Material | Parts |
| --- | --- |
| Naphthalene | 13.5/wt. (70 grams). |
| Tetrachlorethane | 100/vol. (600 ml.). |
| AlCl₃ | 2.16/wt. (11 grams). |
| Chlor wax¹ | 100/vol. (600 ml.). |

¹ 146° F. melting point paraffin wax having 21% Cl.

The naphthalene and tetrachlorethane were first mixed in a flask and heated to 125° F., and then the AlCl₃ was added (all at once). Then the chlor wax was fed into the reaction mixture in a small stream over a period of about 9 minutes, and the temperature of the reaction mixture was held at 125° F. for a total of about 3½ hours from the beginning of the addition of chlor wax. When the reaction was thus substantially completed the reaction mixture was diluted with 800 ml. of tetrachlorethane and then neutralized with 500 ml. of aqueous isopropyl alcohol (about 25 to 30% concentration). The mixture was stirred and then allowed to settle overnight. The upper sludge layer was then removed and 600 grams of a paraffinic lubricating oil having a viscosity of about 43 seconds Saybolt at 210° F. and a V. I. (viscosity index) of about 100 was added to the solvent layer, which was then subjected to high vacuum distillation up to about 300° F. (the absolute pressure being about 10 mm. mercury). The distillation residue amounted to about 1150 grams and therefore the yield of condensation product per se was 550 grams (1150 minus the 600 grams of added blend oil). A small additional amount of blend oil was added to make a blend having an even 40% concentration of Product A, the condensation product per se.

200 grams of the thus prepared 40% Product A blend, which analyzed 5.7% chlorine, indicating that the Product A per se contained 14.25% Cl, was suspended in 400 cc. of ethyl acetate in a suitable agitator and refluxed with stirring for 15 minutes. When cool, a separation of phases took place. The ester extract was removed and a fresh batch of 400 cc. of ethyl acetate added to the raffinate. Refluxing and stirring for 15 minutes were repeated.

The ester extracts thus obtained were combined and distilled to remove ester, and to obtain as residue an oil phase containing 5.6% chlorine and weighing 142 grams was obtained. The blend oil is per se completely miscible with ethyl acetate at room temperature, in all proportions. This means therefore that the ester extraction removed substantially all of the 120 g. blend oil from the Product A blend but at the same time removed about 22 g. of Product A extract calculated to contain about 36.14% Cl and therefore removed the major portion of the most highly chlorinated constituents.

The raffinate obtained was exceedingly rubbery and viscous. To this was added 142 grams of fresh oil, in order to account for that portion removed by the ester extraction, and the mixture was distilled to remove the ethyl acetate contained in the raffinate phase. Analysis of the final product showed only 1.6% chlorine, which means a 70% removal of chlorine from the Product A.

Example 2

The above procedure was repeated except that acetone was used as the solvent. A reduction of 51% in the chlorine content of the Product A was obtained.

Example 3

The procedure of Example 1 was repeated except that secondary amyl alcohol was used as solvent. A reduction of 47% in the chlorine content of the Product A was obtained. Another sample of polymer or condensation product referred to as Product A was made from the following raw materials:

| Material | Parts |
| --- | --- |
| Naphthalene | 13.5/wt. (70 grams). |
| o-dichlor benzene | 50/vol. (300 ml.). |
| AlCl₃ | 2.5/wt. (12 grams). |
| Chlor wax¹ | 100/vol. (518 grams). |

¹ 117–118° F. melting point paraffin wax having 22% Cl.

The naphthalene was first dissolved in the dichlor benzene, then the AlCl₃ was added and the mixture warmed to about 110° F. The chlor wax was then added over a 30-minute period during which the temperature rose to 125° F. where it was held for 5 hours. The reaction mixture was then diluted with more solvent (500 ml.), neutralized with a mixture of alcohol and water, and settled. The aqueous layer was removed, and 300 grams of a paraffinic solvent extracted lubricating oil having a viscosity of 43 seconds Saybolt at 210° F. was added to the solvent layer (to keep the condensation product in solution) and the mixture was then distilled with fire and steam to 550° F. The yield of distillation residue was 832 grams (which amounted to 64% by weight of polymer in the paraffinic blend oil). This blend analyzed 5.2% Cl. In order to make a polymer concentrate containing only 40% polymer, 125 grams of the above described distillation residue (containing 64% of polymer) was blended with an additional 75 grams of paraffinic blend oil, thus making a 40% polymer blend which now analyzed 3.2% Cl.

Following the procedure in Example 1, 200 grams of this 40% polymer blend (80 grams polymer in 120 grams blend oil) were suspended in 400 cc. of ethyl acetate in a suitable vessel and the mixture was refluxed (at 175° F.) with stirring for 15 minutes. After cooling and settling overnight, a separation of phases took place. The upper layer, ester extract, was decanted and the volatile ethyl acetate was removed by high vacuum distillation to 220° F. 136 grams of fluid oil were recovered as distillation residue, and since a number of different blends of ethyl acetate and the same paraffinic oil, ranging from 10 to 90% concentrations, were all mutually miscible at room temperature, this "extract" must have contained the entire 120 grams of blend oil present in the original 200 grams of polymer blend before extraction, and therefore this extract contained only 16 grams of polymer extract per se (136 grams minus 120 grams). The raffinate obtained, which weighed 64 grams (80 grams minus 16 grams) was then diluted with 136 grams of paraffinic blend oil to make a raffinate blend weighing 200 grams, the same weight as that of the original polymer blend before solvent extraction.

Chlorine analyses showed that the original polymer blend contained 3.2% Cl (6.4 grams in the 200 gram sample) and therefore 8.0% Cl in the original polymer per se, while the extract showed 3.2% Cl (4.35 grams of Cl) in the extract blend, or 27.2% Cl based on the 16 grams of polymer extract per se, and 1.2% Cl (2.34 grams of Cl) in the 200 grams of final raffinate blend, or 3.6% based on the 64 grams of polymer raffinate per se.

Thus in this sample, the original wax-naphthalene polymer condensation product containing 8.0% Cl was divided by solvent extraction into a polymer extract containing 27.2% Cl and a polymer raffinate containing 3.6% Cl.

The three samples produced in the above described experiment, namely, the original polymer blend, the extract blend and the raffinate blend, were added in small concentrations to paraffinic lube oils and were submitted to viscosity index and pour depressing tests with the following results:

| Percent in Oil [1] | Viscosity Index | | |
|---|---|---|---|
| | Original Polymer Blend 200 grams | Extract Blend 136 grams | Raffinate Blend 195 grams |
| 0% | 116 | 116 | 116 |
| 1% | 123 | | 121 |
| 2% | 132 | 122 | 123 |
| 5% | 133 | 121 | 131 |
| 10% | | 122 | |

[1] Paraffinic solvent extracted lubricating oil having a viscosity of 43 seconds Saybolt at 210° F.

| Percent in Oil [1] | A. S. T. M. Pour Point, °F. | | |
|---|---|---|---|
| | Original Polymer Blend | Extract Blend | Raffinate Blend |
| 0 | 30 | 30 | 30 |
| 2.5% | −35 or below | −5 | −30 |

[1] Test oil: 90% paraffinic oil of 442 sec. viscosity at 100° F. plus 10% Pennsylvania bright stock.

The above viscosity index data show that the raffinate blend is substantially as efficient in 5% concentration as the original polymer blend whereas the extract blend has relatively little viscosity index improving properties. The pour depressing data show that the raffinate blend reduced the A. S. T. M. pour point from +30° F. to −30° F. when used in 2.5% concentration, and this is substantially as good as the original polymer blend, whereas the extract blend only lowered the pour point to −5° F.

It is apparent therefore that the solvent extraction of the present invention accomplishes a very substantial reduction in residual chlorine content of the polymer condensation product with substantially no loss in V. I. improving property and pour depressing property.

For the sake of comparison some experimental data are given to show that products made according to Patent 2,174,246 from the same raw materials except that the chlorinated paraffin wax has a lower chlorine content, and that less aluminum chloride catalyst is generally sufficient, have good pour depressing properties but have little or no viscosity index improving properties. In carrying out these tests, the procedure used was the same as described in said patent, test #1 herebelow being substantially an exact duplicate of Example VII of said patent, namely, using a chlor wax having 15.2% chlorine and using 1.4% AlCl₃ as catalyst. Test #2 herebelow was made by the same procedure except that the chlor wax used only contained 13.2% chlorine and 4.0% AlCl₃ was used as catalyst. The following quantities of reactants and solvent were used:

|  | Parts by weight |
|---|---|
| Chlor wax | 100 |
| Naphthalene | 13.5 |
| Tetrachlorethane (solvent) | 43 |

The reaction was carried out at 125° F. for 3 hours. After recovery of the condensation high molecular weight product, it was added in small concentrations to lubricating oil and tested for pour depressing and viscosity index properties with the following results:

| Test No. | Reagents | | Product | | Pour Point (A. S. T. M.) | | V. I. Tests (5% in Test Oil) | |
|---|---|---|---|---|---|---|---|---|
| | Per Cent AlCl₃ | Per Cent Cl in Wax | Yield, Per Cent/wt. | Vis. S. S. U. 210° F. | .15% | .075% | S. S. U. 210° F. | V. I. |
| 0 [1] | | | | | +30 | +30 | 42.7 | 100 |
| 1 | 1.4 | 15.2 | 76 | 2,082 | −20 | −10 | 45.6 | 106 |
| 2 | 4.0 | 13.2 | 66 | 1,319 | −15 | −5 | 45.7 | 106 |

[1] Original oil.

These tests showed that products made according to Patent 2,174,246 do have good pour depressing properties because they reduce the A. S. T. M. pour point of a waxy lube oil from +30 to −15 or −20° F. when used in a concentration as low as 0.15%, but they had substantially no viscosity index improving properties because even when used in 5% concentration the viscosity index of the oil was only changed from 100 to 106, whereas effective V. I. improvers should produce about 3 or more times as great an improvement.

In carrying out the solvent extraction of this invention it is desirable to use a volume of solvent equal to at least 50% and preferably about 100 to 500 or 1000% of the volume of the Product A being treated.

Also, if desired, one may add a small amount of a precipitant or anti-solvent, such as water or other suitable liquid serving to facilitate the precipitation or separation of the solvent phase from the Product A.

By repeating the solvent extraction a larger number of times, or by carrying out the solvent extraction in a continuous counter-current operation, especially by the use of a relatively high vertical tower, and under optimum conditions of temperature, ratio of solvent to Product A, etc., a substantially larger amount of the residual chlorine may be removed from the Product A than shown in the above examples. If desired, one may use one type of solvent for one or more stages of solvent extraction and then use a different type of solvent for one or more later stages, or run a continuous counter-current extraction in one tower with one solvent and then in another tower with another solvent.

This application is a continuation-in-part of application Ser. No. 481,432, filed April 1, 1943 (now abandoned).

It is not intended that this invention be limited to the specific examples which have been given merely for the sake of illustration, but only by the appended claims in which it is intended to claim all modifications coming within the scope and spirit of the invention.

We claim:

1. In the process of preparing high molecular weight condensation products by condensing a halogenated high molecular weight aliphatic material having more than 10 carbon atoms and containing at least 15% of halogen, with an aromatic compound to make a higher molecular weight condensation product, which comprises mixing together the aromatic compound, about 0.5–5.0% of a Friedel-Crafts catalyst based on the weight of high molecular weight halogenated aliphatic material, and a low molecular weight halogenated hydrocarbon solvent inert under the reaction conditions, adding the halogenated high molecular weight aliphatic hydrocarbon to the mixture of aromatic compound catalyst and solvent, and maintaining the mixture at a reaction temperature until the reaction is completed, the arithmetical product of the percent of catalyst, based on the weight of halogenated high molecular weight aliphatic material, times the square of the percent by weight of halogen in the halogenated high molecular weight aliphatic material being at least 400, the improvement comprising extracting the condensation product, with a solvent for halogenated hydrocarbons to remove residual halogenated hydrocarbon therefrom.

2. Process according to claim 1 in which the extraction solvent is an organic liquid containing hydrogen, carbon and at least one other element.

3. Process according to claim 1 in which the extraction solvent is a liquid organic compound containing at least one aliphatic hydrocarbon group and containing at least one element selected from the group consisting of oxygen and nitrogen.

4. Process according to claim 1 in which the extraction solvent is a liquid organic compound containing at least one aliphatic hydrocarbon group and containing oxygen.

5. Process according to claim 1 in which the extraction solvent is an organic liquid consisting of carbon, hydrogen, and oxygen, the number of oxygen atoms being at least as great as one-half the number of the carbon atoms.

6. Process according to claim 1 in which the extraction solvent is an ester.

7. Process according to claim 1 in which the extraction solvent is ethyl acetate.

8. Process according to claim 1 in which the solvent extraction is effected by repeated batch extraction at about 150° F.–250° F.

9. Process according to claim 1 in which the solvent extraction is effected by continuous countercurrent extraction in a vertical tower.

10. In the process of preparing high molecular weight condensation products by condensing a halogenated high molecular weight aliphatic material having more than 10 carbon atoms and containing about 20 to 30% of halogen, with an aromatic compound to make a higher molecular weight condensation product, which comprises mixing together the aromatic compound, about 1 to 3% of a Friedel-Crafts catalyst, based on the weight of high molecular weight halogenated aliphatic material and a low molecular weight halogenated hydrocarbon solvent inert under the reaction conditions, adding the halogenated high molecular weight aliphatic hydrocarbon to the mixture of aromatic compound catalyst and solvent, and maintaining the mixture at a reaction temperature until the reaction is completed, the arithmetical product of the percent of catalyst, based on the weight of halogenated high molecular weight aliphatic material, times the square of the percent by weight of halogen in the halogenated high molecular weight aliphatic material being at least 400, the improvement comprising extracting the condensation product with a solvent consisting essentially of an organic liquid containing hydrogen, carbon and at least one other element.

11. The process of condensing a halogenated high molecular weight aliphatic material having more than 10 carbon atoms containing about 15 to 30% of halogen, with an aromatic compound to make a higher molecular weight condensation product which comprises mixing together the aromatic compound, about 0.5–5.0% of a Friedel-Crafts catalyst based on the weight of high molecular weight halogenated aliphatic material, and a low molecular weight halogenated hydrocarbon solvent inert under the reaction conditions, adding the halogenated high molecular weight aliphatic hydrocarbon to the mixture of aromatic compound catalyst and solvent, and maintaining the mixture at a reaction temperature until the reaction is completed, the arithmetical product of the percent of catalyst, based on the weight of halogenated high molecular weight aliphatic material, times the square of the percent by weight of halogen in the halogenated high molecular weight aliphatic material being at least 400, hydrolyzing and removing the catalyst, subjecting the reaction product to distillation under reduced pressure to obtain a condensation product substantially non-volatile up to at least 400° F., and extracting said distillation residue with a solvent for halogenated hydrocarbons to remove residual halogenated hydrocarbons therefrom, said extraction solvent being a liquid organic compound containing hydrogen, carbon and at least one other element.

12. The process which comprises mixing together naphthalene, aluminum chloride and tetrachlorethane and adding thereto chlorinated paraffin wax containing about 25% chlorine, using about 3-8 mols of chlorinated wax per mol of naphthalene, about 1-3% of aluminum chloride based on the weight of the chlorinated wax and about 20-100 volumes of tetrachlorethane per 100 volumes of chlorinated wax, and maintaining the reaction mixture at a temperature between the approximate limits of 70-150° F. for a reaction time of about ¼ to 5 hours, treating the reaction mixture with a hydrolyzing agent, settling and removing the catalyst sludge therefrom, distilling the reaction products under reduced pressure to a temperature of at least 400° F. to obtain a high molecular weight wax-naphthalene condensation product soluble in mineral oils and having pour-depressing and viscosity-index improving properties as distillation residue, and extracting said distillation residue with ethyl acetate to reduce the chlorine content thereof to less than 2%.

13. A product made by the process of claim 1, said condensation product containing less than 2% of halogen.

14. Product of the process defined in claim 12.

15. Composition comprising a major proportion of waxy mineral lubricating oil and at least a pour depressing amount of a product made by the process defined in claim 12.

CALEB E. HODGES.
ALOYSIUS F. CASHMAN.

REFERENCES CITED

The following references are of record in the file of this patent:

UNITED STATES PATENTS

| Number | Name | Date |
|---|---|---|
| 2,339,493 | Lieber et al. | Jan. 18, 1944 |
| 2,297,292 | Davis et al. | Sept. 29, 1942 |
| 2,030,307 | McLaren | Feb. 11, 1936 |